INVENTORS
CARL W. GOODWIN
HAROLD W. MARTIN
BY
ATTORNEY

July 27, 1943.  C. W. GOODWIN ET AL  2,325,163
CAPPING MACHINE
Filed June 23, 1941  6 Sheets-Sheet 2
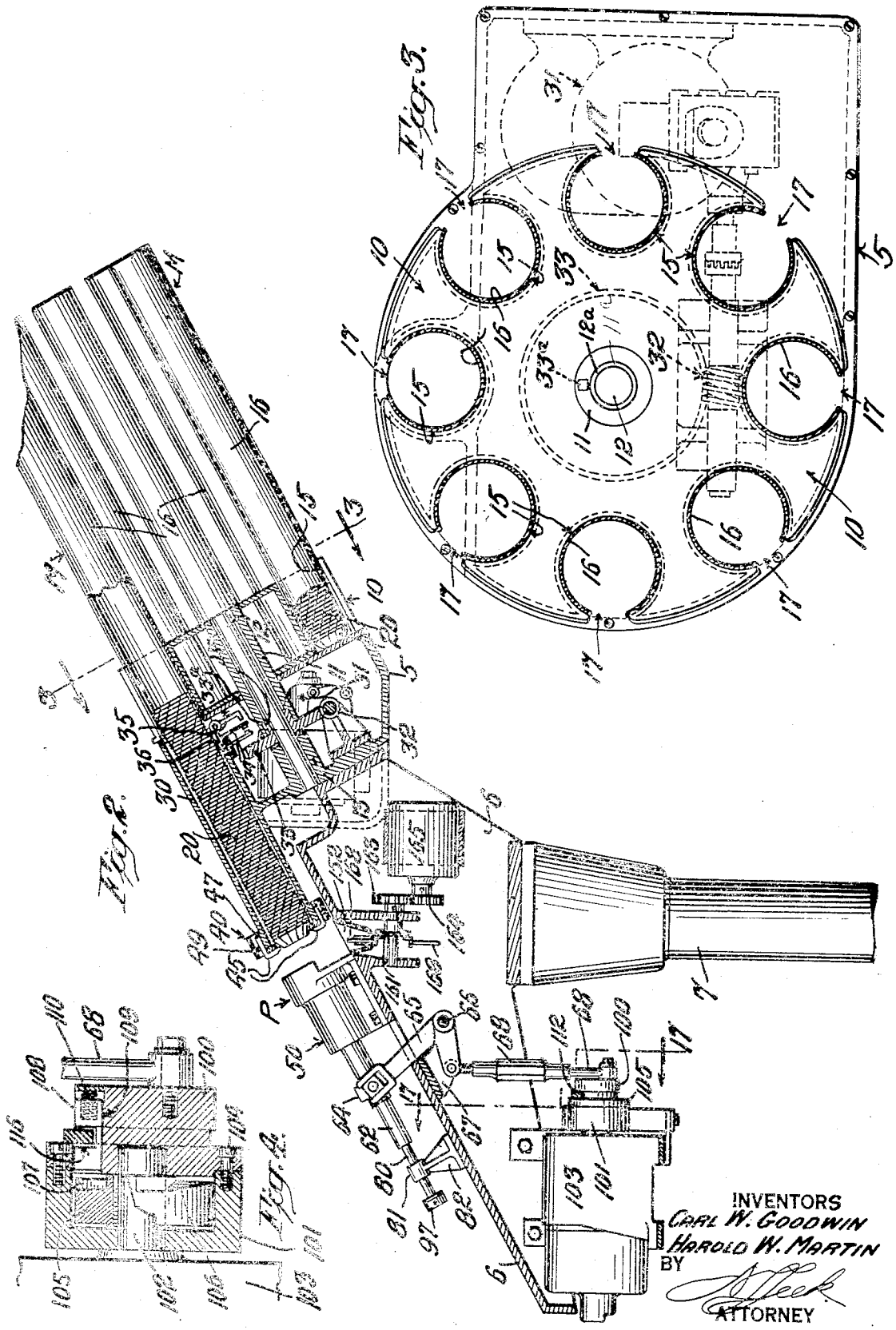
INVENTORS
CARL W. GOODWIN
HAROLD W. MARTIN
BY
ATTORNEY

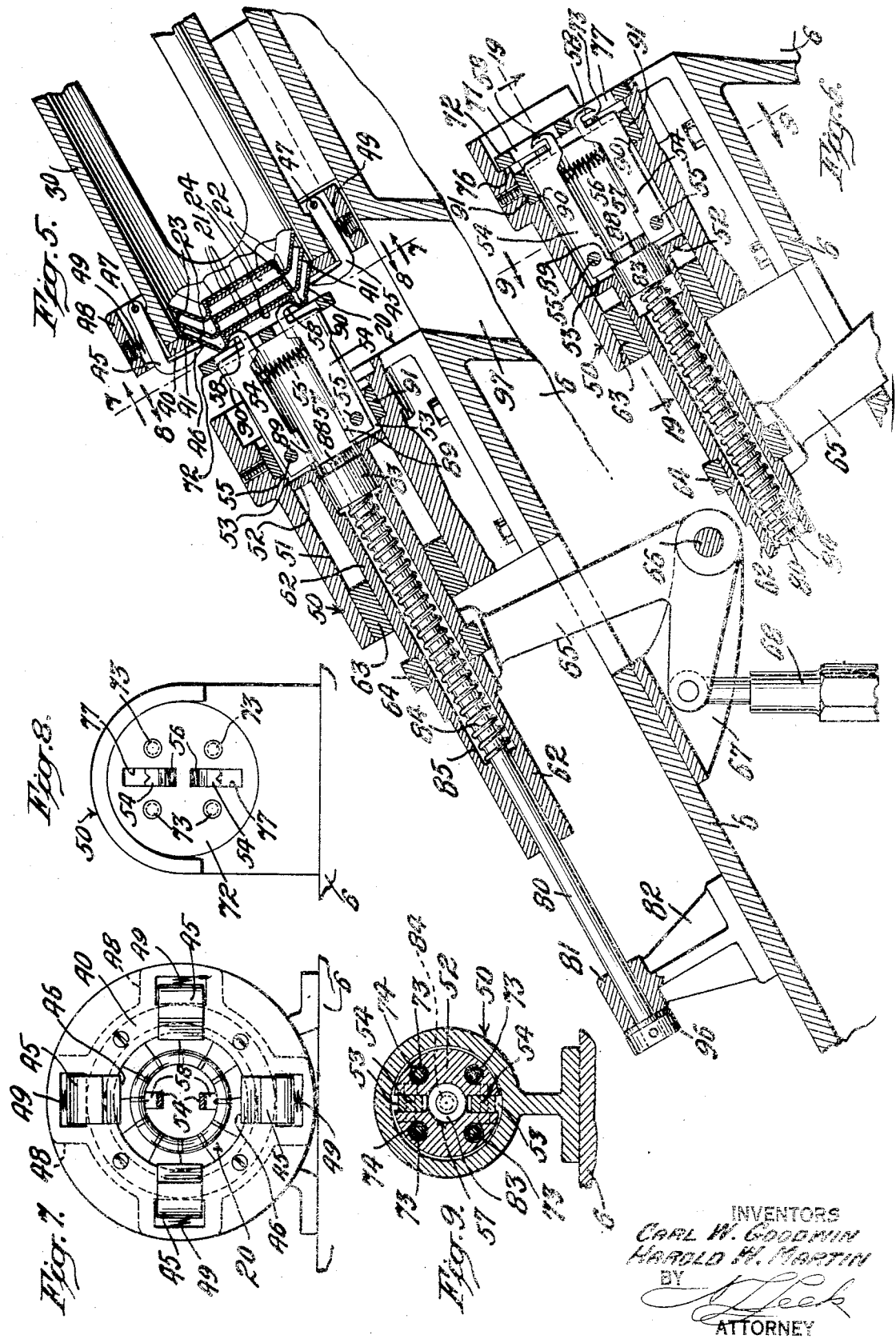

July 27, 1943.  C. W. GOODWIN ET AL  2,325,163
CAPPING MACHINE
Filed June 23, 1941  6 Sheets-Sheet 4
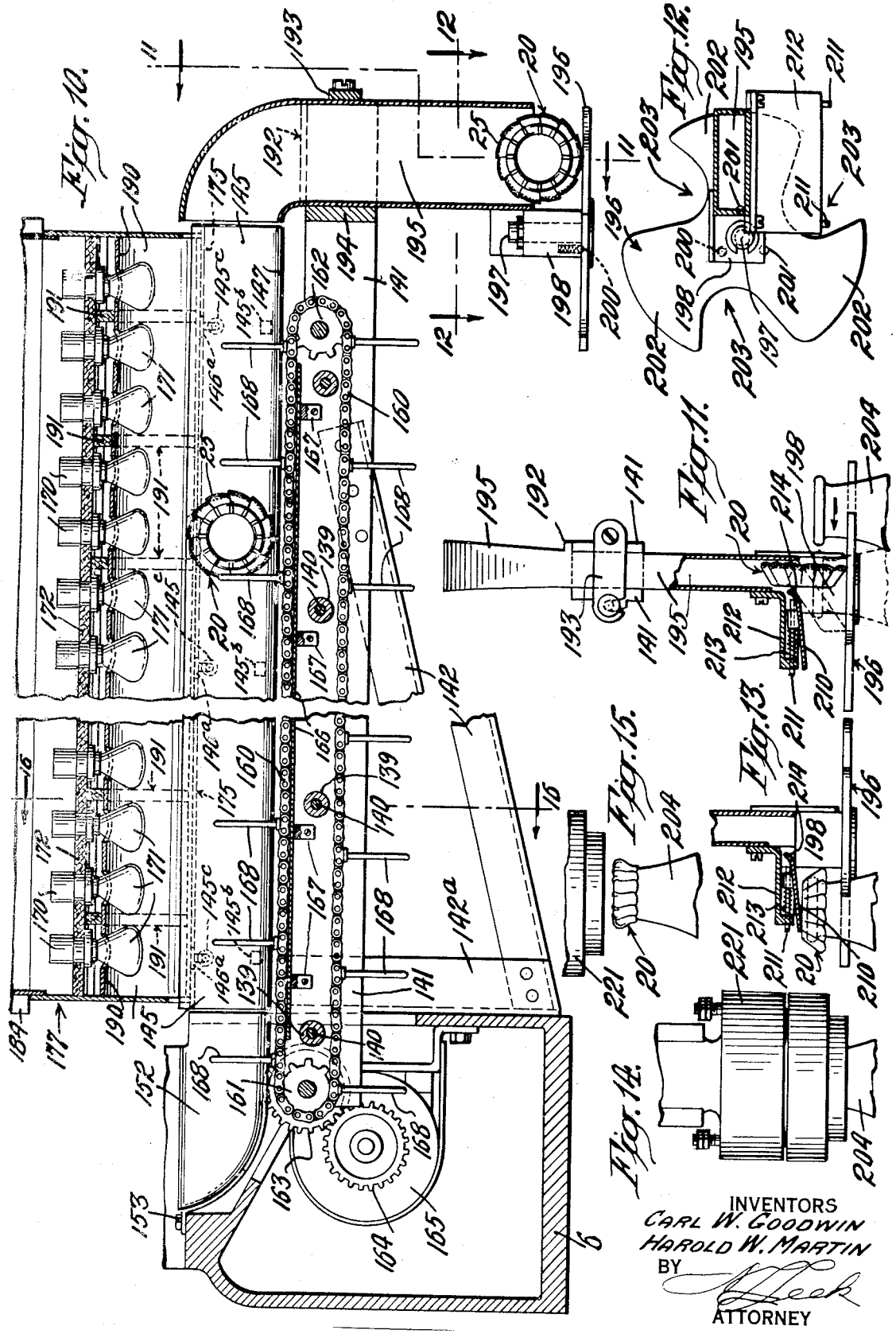
INVENTORS
CARL W. GOODWIN
HAROLD W. MARTIN
BY
ATTORNEY

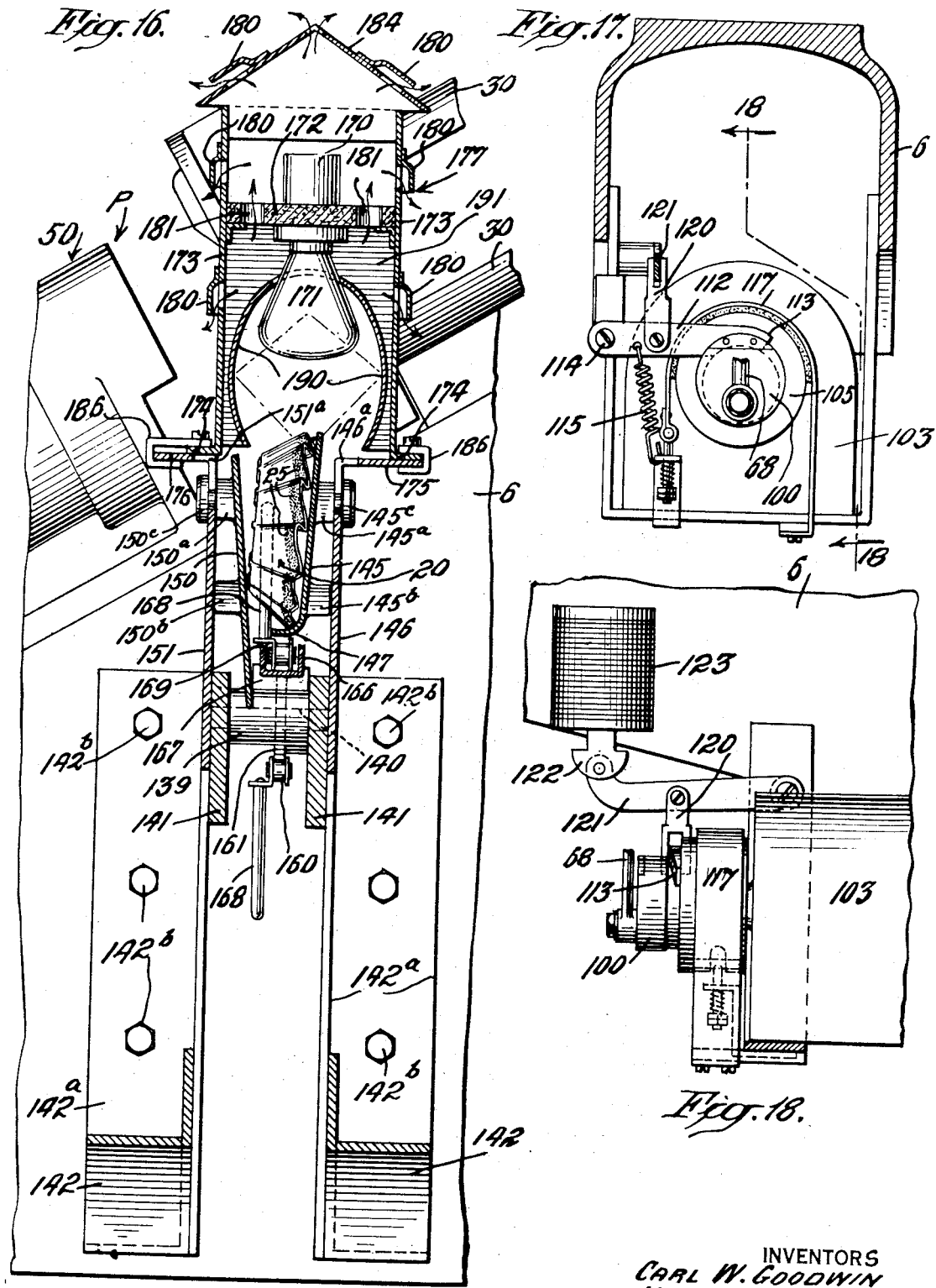

July 27, 1943.　　　C. W. GOODWIN ET AL　　　2,325,163
CAPPING MACHINE
Filed June 23, 1941　　　6 Sheets-Sheet 6
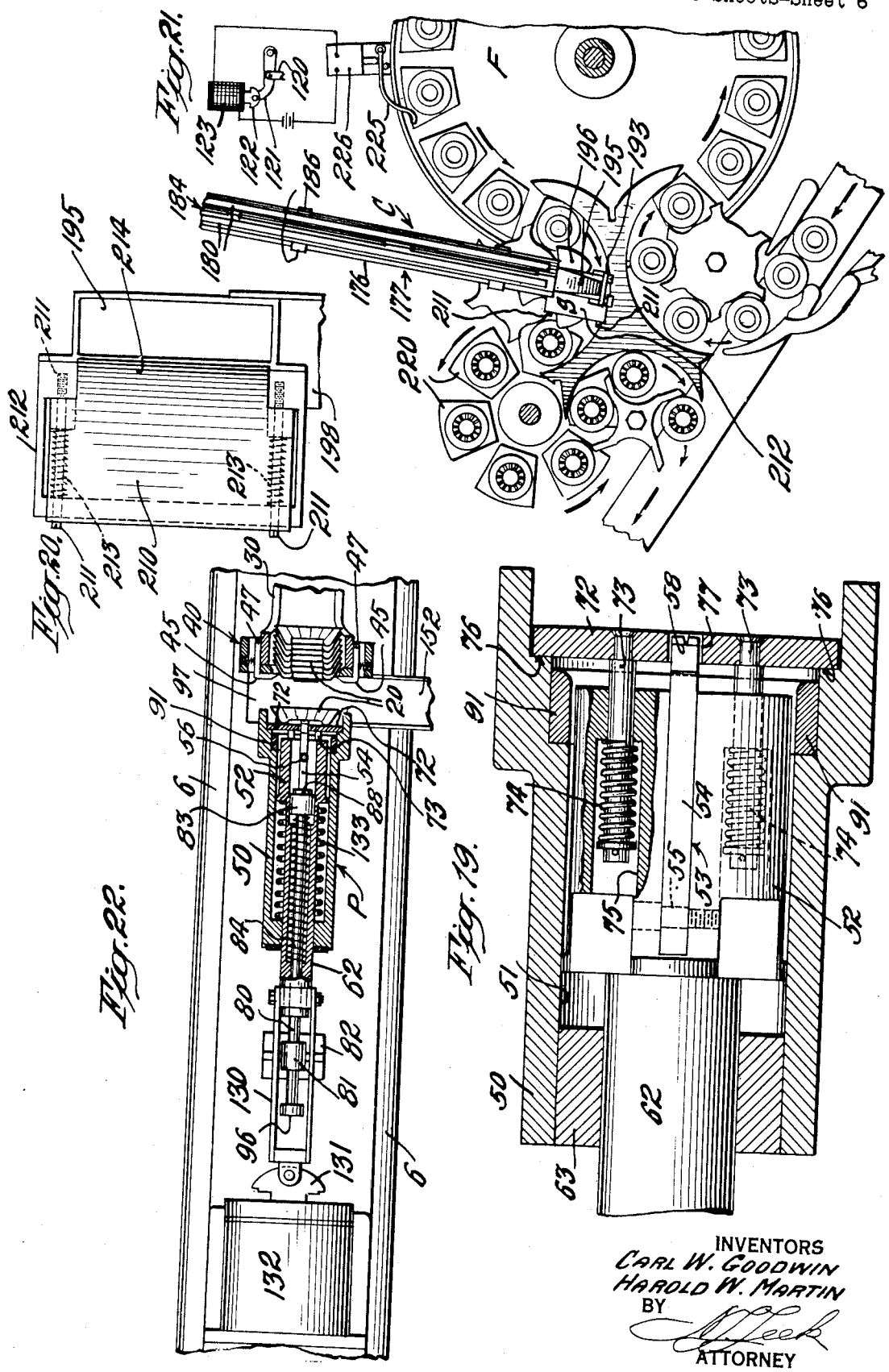
INVENTORS
CARL W. GOODWIN
HAROLD W. MARTIN
BY
ATTORNEY Patented July 27, 1943

2,325,163

UNITED STATES PATENT OFFICE 2,325,163

CAPPING MACHINE

Carl W. Goodwin, Plainfield, N. J., and Harold W. Martin, Malverne, N. Y., assignors to American Seal-Kap Corporation of Delaware, Wilmington, Del., a corporation of Delaware Application June 23, 1941, Serial No. 399,280

7 Claims. (Cl. 226—83)

This invention relates to a machine and method for applying flexible skirted hood caps to milk bottles or the like and more particularly to a machine for applying and sealing caps of the above type having a pleated skirt coated in whole or in part with a thermoplastic adhesive which requires heat and pressure for sealing.

An object of the invention is to provide a mechanism of the above type having novel and improved details of construction and features of operation.

Another object is to provide a novel and improved mechanism of the above type having characteristics suited for commercial operation.

Another object is to provide a cap applying and sealing mechanism of the type above indicated which may be used with a standard filling and capping machine without requiring alterations in such machine.

Another object is to provide a machine of the type above indicated which is capable of receiving a sufficient supply of caps to enable the machine to operate without attention and without replenishing the cap supply for a substantial period of time.

Another object is to provide novel and improved pick-up means for removing successive caps from a stack.

Another object is to provide means for automatically positioning a succession of stacks of caps in operative relationship with respect to the pick-up mechanism.

Another object is to provide novel and improved heating means suited to heat to a softening temperature the adhesive carried on the skirts of the caps.

Another object is to provide heating means for the purpose above indicated which is adapted to heat the thermoplastic adhesive without heating the skirt or the material of the cap itself to any substantial degree.

Another object is to provide novel and improved mechanism for applying a cap of the type above indicated to a bottle with the adhesive heat-softened for sealing.

Another object is to provide a heating mechanism of the type above indicated which may be readily disassembled for cleaning.

Another object is to provide a heating mechanism of the above type in which the heating is accomplished by focused radiant heat rays.

Another object is to provide a heating mechanism of the above type in which the source of heat may be instantly interrupted upon stoppage of the mechanism, whereby danger of overheating of the cap is eliminated.

Another object is to provide a heating mechanism of the above type which is ready for instant use when the machine is connected for operation.

Another object is to provide novel and improved mechanism for applying caps to bottle necks.

Various other objects and advantages will be apparent as the nature of the invention is more fully disclosed.

In one embodiment the present machine provides a magazine adapted to contain a plurality of stacks of nested preformed caps which are arranged to be successively brought into operative position to feed the stacks of caps into a supply chamber from which they are successively picked by a novel and improved picker mechanism and are rolled along a feed chute on the lower edges of their skirts. Radiant heat rays are focused on the upper edges of the skirts of the rolling caps so as to soften a band of the adhesive extending around the skirt. Mechanical feed means are provided for rolling the caps along said feed chute at a predetermined speed suited to raise the adhesive to softening temperature. The caps are fed by the chute to a capping station where they are held in position to be picked off by the horizontally advancing necks of successive milk bottles and to be carried thereby to a sealing station. The sealing station in the form shown comprises a rotating turret having a plurality of sealing heads which are adapted to fold the skirts around the necks of the milk bottles and hold the same under sealing pressure until the adhesive has cooled and set.

The feed of the caps is so synchronized with respect to the feed of the milk bottles that the caps are successively fed to the capping station to meet the advancing milk bottles as they pass such station. The caps thus do not remain at the capping station a sufficient period of time for the adhesive to cool below its sealing temperature.

Although the novel features which are believed to be characteristic of this invention are pointed out more particularly in the claims appended hereto, the invention itself may be better understood by referring to the following description, taken in connection with the accompanying drawings forming a part thereof in which a specific embodiment of the invention has been set forth for purposes of illustration.

In the drawings,

Fig. 2 is a transverse longitudinal section taken along the line 2—2 of Fig. 1 showing the supply magazine and picker mechanism;

Fig. 3 is a transverse section taken on the line 3—3 of Fig. 2;

Fig. 4 is a detail view of a one-revolution clutch used for operating the picker mechanism;

Fig. 5 is an enlarged section taken on the line 5—5 of Fig. 1 showing the details of the picker mechanism;

Fig. 6 is a longitudinal section similar to Fig. 5 showing the picker mechanism in retracted position;

Figure 1:
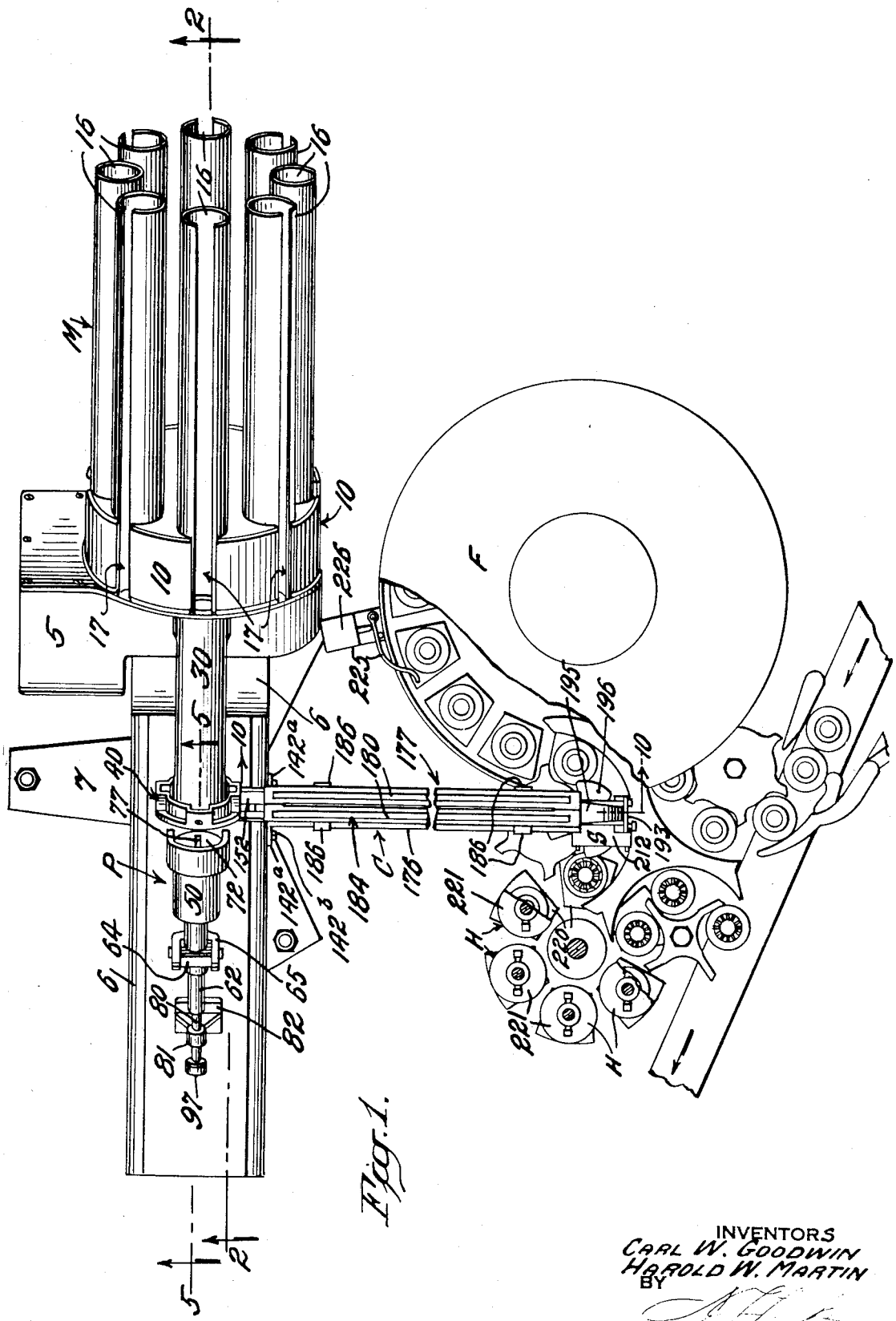
Fig. 1 is a top plan view of a cap applying and sealing mechanism embodying the present invention.

Figs. 7 and 8 are transverse sections taken on the lines 7—7 and 8—8 respectively of Fig. 5;

Fig. 9 is a transverse section taken on the line 9—9 of Fig. 6;

Fig. 10 is a longitudinal section through the feed chute and lamp housing taken along the line 10—10 of Fig. 1;

Fig. 11 is a transverse section taken along the line 11—11 of Fig. 10;

Fig. 12 is a horizontal section taken on the line 12—12 of Fig. 10;

Figs. 13, 14 and 15 are detail views illustrating successive steps in the capping and sealing operation;

Fig. 16 is a transverse section on the line 16—16 of Fig. 10 showing the feed chute and lamp housing;

Fig. 17 is a section taken on the line 17—17 of Fig. 2 showing the one-revolution clutch;

Fig. 18 is a section taken on the line 18—18 of Fig. 17;

Fig. 19 is a section taken on the line 19—19 of Fig. 6 showing details of the picker mechanism;

Fig. 20 is a bottom plan view of the cap applying mechanism;

Fig. 21 is a diagrammatic view illustrating the path of the bottles and caps through the machine; and Fig. 22 is a longitudinal section similar to Fig. 5 illustrating a different embodiment of drive means for the picker mechanism.

In the following description and in the claims certain specific terms have been used for convenience in referring to various details of the invention. These terms, however, are to be given as broad an interpretation as the state of the art will permit.

Referring to the drawings more in detail, the invention is shown in Fig. 1 as applied to a capping and sealing mechanism comprising magazine M having a plurality of tubes adapted to contain a plurality of stacks of nested caps for successive application to milk bottles, a picker mechanism P, which is adapted to pick successive caps from said stacks and supply them to a chute C along which the caps roll on the lower edges of their flared skirts in the path of radiant heat rays which are focused onto the adhesive carried by the skirt. From the chute C the caps pass to a cap applying station S where they meet and are picked off by the advancing necks of milk bottles and are carried to a bank of rotating capping heads H which contract the skirts around the necks of the bottles and hold the same under sealing pressure.

The milk bottles are received by a suitable conveyor, passed through a filling device F of standard construction wherein they are filled with milk, thence past the cap applying station S and to the capping heads H above mentioned, after which they are redelivered to the conveyor. The filling station F and the capping heads H form a part of the standard filling and capping apparatus, the details of which form no part of the present invention. The capping heads H may, for example, be of the form disclosed in a copending application, Goodwin and Martin, Ser. 383,752 for Capping head. The capping head is particularly designed to fold and seal caps of the type referred to herein. It is to be understood, however, that other types of capping heads and other types of caps may be used if desired.

The magazine M, picker P and chute C, in accordance with the present invention, are formed as a unit mounted on a suitable pedestal which may be positioned to supply caps with heat softened adhesive to the milk bottle heads as they advance from the filler F to the capping heads H on a standard filling and capping machine as above mentioned. These mechanisms are described more in detail as follows:

*Cap magazine*

The cap magazine is shown in Figs. 2 and 3 as comprising a stationary housing 5 attached by a bracket 6 to a pedestal 7 adapted to rest upon the floor in a convenient position with respect to the filling machine. A rotatable turret 10, in the form of a hollow casting having a hub 11, is mounted for rotation on a bearing sleeve 12a carried on a stationary pin 12 which is mounted in a boss 13 formed in the housing 5. The turret 10 is provided with a plurality of openings 15 adapted to receive tubes 16 which carry the various stacks of caps 20. The tubes 16 and the corresponding portions of the turret 10 are provided with longitudinal openings 17, which facilitate the manual filling of the tubes with the stacks of caps.

In practice the stacks of caps are usually wrapped in paper to form units corresponding in size and length generally to the tubes 16. The units are inserted as such in said tubes and the stack is unwrapped in situ by unrolling and removing the paper through the longitudinal slots 17. This procedure not only facilitates the loading of the magazine, but prevents the caps from being touched by the hand during the loading operation.

The caps 20 may be of the general type disclosed in the copending application of Herbert G. Vore, Ser. No. 391,125, which comprises a central diaphragm or closure portion 21, (Fig. 5) an annular pouring lip housing 22 and a fluted skirt 23 carrying a band of thermoplastic adhesive 25 (Fig. 16) on the outer surface thereof. A disc 24 may be positioned within the recess formed by the diaphragm 21 and the pouring lip housing 22 for increasing the holding power of the cap when seated on the internal ledge of a milk bottle.

The caps 20 are inserted in the tubes 16 with their fluted skirts 23 extending rearwardly and with their diaphragms 21 and pouring lip housings 22 extending forwardly. The magazine M is arranged at an inclination to the horizontal such that the caps feed forwardly by gravity.

The housing 5 is formed with a cap supply chamber 30 with which the successive tubes 16 are adapted to register as the turret 10 is rotated, so that the caps from the corresponding tubes 16 slide downwardly by gravity into the supply chamber 30 when the tubes are properly positioned.

For rotating or indexing the turret 10, a motor 31 is provided driving a worm 32 which meshes with a worm wheel 33 rotatably mounted on the pin 12 and having a key 33a engaging a keyway 11a in the hub 11 of the turret 10. The turret may thus be lifted from the pin 12 and removed for cleaning without disturbing the gear 33 and driving mechanism. The worm gears provide a non-reversible drive to hold the turret against rotation when the motor is stopped. Suitable latch means may be used, however, if desired, to latch the turret in successive feed positions.

The motor 31 is controlled by a pair of contacts 34 which are closed by a spring pressed finger 35 carried in the housing 5. The finger 35 is provided with a lever 36 which is adapted to engage the skirts of a stack of caps for holding the finger out of engagement with the contacts 34 when the supply chamber 30 contains a stack of caps. When the entire stack has been fed past the lever 36, the spring pressed finger is thereby released and is caused to close the contacts 34 which actuate the motor 31. The motor accordingly drives the worm gear 33 and causes the turret 10 to rotate slowly. This rotation of the turret continues until a tube 16 containing a supply of caps 20 is brought into registration with the supply chamber 30. When this occurs the stack of caps in the tube 16 slides downwardly into the supply chamber, engages the lever 36, actuates the finger 35 to open the contacts 34 and thereby stops the motor 31. The turret 10 remains in this position until the supply of caps in the tube 16 cooperating with the supply chamber 30 is exhausted, after which the above mentioned operation is repeated to bring a new tube 16 into supply position. The empty tubes 16 may be manually filled from time to time as required. In this way a large number of caps is maintained at all times in the magazine M.

The supply chamber 30 is provided at its discharge end with a cap retaining ring 40 (Figs. 2, 5 and 7) having a bevelled inner surface 41. The bevelled surface 41 is adapted to engage and retain the skirt 23 of the forward cap so as to hold the stack of caps in the supply chamber 30 until the individual caps are successively removed by the picker mechanism to be described. The retaining ring 40 is assisted in this holding operation by a plurality of spring pressed retaining fingers 45, which are mounted on the housing 5 and are provided with points 46 which extend inwardly beyond the inner edge of the ring 40. The fingers 45 are pivoted as at 47 to ears 48 formed on the housing 5. The springs 49 normally hold the fingers 40 in their innermost position but permit retraction thereof as the caps are successively withdrawn through the opening in the ring 40.

*Picker mechanism*

The picker mechanism is shown in Figs. 5 to 9 and 19 as comprising a housing 50 mounted on the bracket 6 and forming a cylinder 51 in which a head 52 is slidably mounted. The head 52 is provided with a diametrical slot 53 in which picker fingers 54 are pivotally mounted by means of pins 55. A spring 56, extending between opposite picker fingers 54 in said slot 53, tends to hold said fingers 54 outwardly. The fingers 54 are provided with curved points 58 which are adapted to enter the recess in the cap formed by the depressed diaphragm 21 and engage the inner surface of the pouring lip housing 22. The head 52 carries a sleeve 62, which extends outwardly through a bearing 63 in said cylinder 50 and carries a collar 64 which is engaged by a forked arm 65 pivoted at 66 to a bracket 67 carried by the housing 5. The arm 65 is attached to a link 68 by means of which the head 52 is reciprocated.

A stripper plate 72 is carried on pins 73 (Fig. 19) which are slidably mounted in the head 52 and are normally held in a retracted position by springs 74 seated in bores 75 in said head 52. The stripper plate 72 seats against a shoulder 76 formed in the housing 50 to limit the rearward movement thereof and to permit the fingers 54 to be retracted beyond the forward surface of said plate. The stripper plate 72 is provided with slots 77 through which the fingers 54 extend when they are in advanced position.

A rod 80 is seated within the sleeve 62 and is slidably held in a boss 81 carried in a bracket 82 attached to the housing 5. The rod 80 is provided with a head 83 sliding within the sleeve 62 and in a bore 57 in the head 52 and is normally held in advanced position by a spring 84 located in a bore 85 of said sleeve. The head 83 is provided with a shoulder 88 which is adapted to engage surfaces 89 formed on the fingers 54 for holding the fingers in retracted position as shown in Fig. 6. A collar 96 carried on the rod 80 engages the boss 81 to limit the forward movement of the rod.

The fingers 54 are provided with cam surfaces 90 adapted to engage the inner surface of a retracting ring 91 mounted within the cylinder 51 for retracting the fingers 54 on the rearward movement of the head 52. A discharge passage 97 is formed in the housing 5 to receive the caps from the picker mechanism.

The picker mechanism is normally held in its rearward position as shown in Fig. 6 with the fingers 54 retracted and withddrawn within the confines of the stripper plate 72, the fingers 54 being locked in retracted position by the shoulder 88 of the head 83 engaging the surfaces 89 of said fingers. As the head 52 is advanced by the forked arm 65, the rod 80, head 83, head 52 and fingers 54 advance as a unit. The stripper plate 72, however, remains in the position shown in Fig. 19 until the head 52 has advanced sufficiently to engage the rear surface thereof, the pins 73 sliding in the head 52 during this portion of the movement. When the head 52 has advanced to engage the stripper plate 72, the points of the fingers 54 project through the slots 77 in the stripper plate a sufficient distance to engage within the depressed central diaphragm portion of the cap.

Thereafter, the head 52, fingers 54 and stripper plate 72 advance as a unit until the collar 96 of the rod 80 engages the boss 81 of the bracket 82 and prevents further forward movement of the rod 80. Further movement of the head 52 then causes the sleeve 64 to move with respect to the rod 80 compressing the spring 84 and releasing the surfaces 89 of the fingers 54 from the shoulder 88 of the head 83, thereby permitting the fingers 54 to snap open, in response to the pressure of the spring 56, into cap engaging position as shown in Fig. 5.

The arrangement is such that the stripper plate 72 engages the pouring lip housing of the forward cap 20 and slightly lifts the stack for straightening and centering the caps before the fingers 54 have been allowed to snap open, thereby assuring the proper positioning of the forward cap with respect to said fingers. When the fingers 54 are snapped open as above mentioned the points 58 thereof engage the inner surface of the pouring lip housing 22 and securely grip the same.

On the return stroke of the head 52 the cap 20 is pulled through the retaining ring 40 by the points 58 of the fingers 54. The retaining fingers 45 are retracted by the skirt of the cap 20 as it is pulled through the retaining ring 40 but snap back against the skirt of the succeeding cap to strip the same from the forward cap and to prevent more than one cap from being pulled through the retaining ring. It is to be understood, of course, that the fingers 45 may be omitted if the desired stripping action is obtained by the retaining ring itself.

When the fingers 54 have reached a position such that the cam surfaces 90 thereof engage the retracting ring 91 the fingers are retracted and release the cap. At about this point the stripper plate 72 engages the shoulder 76 of the housing 50 and further rearward movement of the head 52 causes the fingers 54 to be withdrawn beyond the forward surface of the stripper plate, thereby leaving a smooth surface down which the released cap slides to the discharge passage 97. The withdrawal of the points 58 of the fingers 54 beyond the surface of the stripper plate 72 eliminates any projections or irregularities which might interfere with the free movement of the released cap to the discharge passage 97.

With the fingers 54 retracted as above mentioned, the surfaces 89 thereof are again brought into alignment with the shoulder 88 of the head 83 and permit the head to snap outwardly in response to the action of the spring 84 to engage said surfaces and retain said fingers in retracted position, as shown in Fig. 6.

By the mechanism above described, at each stroke of the arm 65 the forward cap is removed from the supply chamber 30 and is deposited in the discharge passage 97. By utilizing a pair of spaced pick-up fingers 54 as shown, any distortion or elongation of the diaphragm portion 21 of the cap due to the action of the fingers on the pouring lip housing in one direction causes a contraction of said pouring lip housing in the opposite direction which pinches the disc 24 and retains the same securely in the cap. It is obvious, however, that any desired number of pick-up fingers may be employed. A specific embodiment has been shown for purposes of illustration only.

Picker operating mechanism

In the embodiment shown the picker mechanism is operated by a one-revolution clutch which may be of any standard construction, one form of which is illustrated in Figs. 4, 17 and 18. Referring to the above figures, the link 68 is shown as connected to an eccentric 100, which is attached by means of screws 104 to a housing 101. In the embodiment shown the housing 101 is rotatably mounted on the shaft 102 of a motor 103. The shaft 102 carries a clutch head 105 having an inclined helical surface 106 terminating in a shoulder 107. A key 108, which slides in a slot 109 in the eccentric 100, is held by a spring 110 in a position to engage the shoulder 107 and thereby cause the eccentric 100 to rotate with the shaft 102. When retracted the key 108 is released from the clutch head 105 and allows the eccentric 100 to stop rotating.

The key 108 is actuated by an arm 112, which is pivoted as at 114 (Fig. 17) to the frame of the machine and is held downwardly by spring 115. The arm 112 is provided with an inclined forward surface 113 adapted to engage a slot 116 in the key 108 for retracting the same when the key rotates into engagement with said surface. A brake 117 may be used to operate as a drag on the housing 101 to stop the same from rotation when the key 108 is withdrawn.

The arm 112 is attached to a link 120, which is connected to a lever 121 attached to the core 122 of a solenoid 123 or to the armature of an electromagnet, which is adapted when energized, to lift the arm 112 from the slot 116 and release the key 108.

In this embodiment, when the solenoid 123 is momentarily energized, the arm 112 releases the key 108 as above mentioned, thereby permitting the key to engage the shoulder 107 and cause the eccentric 100 to rotate. Deenergization of the solenoid 123, however, releases the arm 112 and permits the same to rest upon the surface of the eccentric 100. As the eccentric rotates, the slot 116 of key 108 engages the inclined surface 113 of the arm 112, thereby gradually withdrawing the key 108 until it reaches the original position illustrated in Fig. 4, thereby disengaging the clutch and bringing the eccentric 100 to rest. In this way the eccentric is caused to rotate once each time the solenoid 123 is momentarily energized. It is to be understood, of course, that any other standard type of one-revolution clutch may be substituted for that herein disclosed.

An alternative means for actuating the sleeve 62 as illustrated in Fig. 22. In this embodiment the head 52 engages a spring 133 seated within the housing 50, which tends to normally hold the head 52 and associated picker mechanism in forward position. The sleeve 62 is connected by a bracket 130 to the core 131 of a solenoid 132. Energization of the solenoid 132 serves to retract the head 52 against the action of the spring 133. Upon deenergization, the spring 133 advances the head 52 and associated picker mechanism. Consequently, the picker mechanism is caused to complete a single cycle each time the solenoid 132 is energized and released. The head 52 is normally held by the spring 133 in its forward position so that the stripping plate 72 engages the pouring lip housing of the foremost cap and the fingers 54 are in cap engaging position as shown in Fig. 5.

Feed chute

The feed mechanism, as shown more in detail in Figs. 10 and 16, comprises a pair of transverse brackets 141 secured in spaced relationship by pins 140 and spacing sleeves 139. The brackets 141 are shown as attached to the bracket 6 and supported by inclined bracing members 142 and vertical struts 142a forming a cantilever truss. The vertical struts 142a are secured to the bracket by bolts 142b. A back plate 146 and a front plate 151 (Fig. 16) are secured by suitable means, as by welding, to the brackets 141 and are formed with top horizontal flanges 175 and 176 respectively.

A horizontal cap feed plate 145 is mounted in a slightly inclined position on a back plate 146 and is provided with a bottom lip 147, which is adapted to support the bottom edge of the cap skirt as the cap is rolled along the plate 145 by the means to be described. A guide plate 150 is spaced from the plate 145 to hold the cap in proper position thereon. The plate 150 is mounted in an inclined position on the front plate 151 so as to engage only the lower edge of the pouring lip housing 22 of the cap.

The feed plate 145 and the guide plate 150 are mounted by any suitable means on the back plate 146 and the front plate 151 respectively, and are preferably arranged so as to be readily removable therefrom to permit convenient disassembling and cleaning of the equipment. In the embodiment shown, the plates 145 and 150 are provided with positioning lugs 145a, 145b and 150a, 150b, respectively which rest against the inner surfaces of the plates 146 and 151. The lugs 145a and 150a carry pins 145c and 150c which are provided with enlarged heads and removably seat in bayonet slots 146a and 151a in the plates 146 and 151. The lugs 145b and 150b may be extended downwardly to rest on the brackets 141 if desired. Obviously, the lugs 145a and 145b and the corresponding lugs 150a and 150b may be extended downwardly to rest on the brackets 141 if desired. Obviously, the lugs 145a and 145b and the corresponding lugs 150a and 150b may be formed as single elongated lugs attached to the backs of plates 145 and 150 at convenient intervals and as many of such lugs as required may be spaced along said plates.

A guide plate 152 may be attached to the bracket 6 by screws 153 in a position to receive caps from the discharge passage 97 and feed the same to the feed plate 145.

For advancing the caps on the feed plate 145, a chain 160 is provided which passes around sprockets 161 and 162, rotatably mounted between the brackets 141. The sprocket 161 is shown as attached to a gear wheel 163 meshing with a gear 164 driven by an electric motor 165 positioned within the bracket 6. The chain 160 may, however, be driven in any other convenient manner.

The chain 160 carries a series of pins 168 which extend upwardly between the guide plate 150 and the feed plate 145 in a position to engage the cap 20 on the feed plate 145. The pins 168 extend upwardly only a slight distance above the center line of said caps and terminate well beneath the level of the top edges of the skirts for the reasons to be pointed out.

The chain 160 runs in and is supported by a removable channel 166 which rests upon a series of brackets 167 attached to the back bracket 141. The channel 166 is provided with a front lip 169 on which the bottoms of the pins 168 ride. The bottom lip 147 of the feed plate 146 contacts with the sides of the pins 168 so that the pins are positioned and guided by the lips 147 and 169 as they advance. The guide plate 150 preferably extends downwardly past the top of the front bracket 141 to prevent a displaced cap from catching thereon and clogging the chute.

The advancing pins 168 cause the caps which are received from the guide plate 152 to roll along the feed plate 145 to the discharge end thereof on the lower edges of their skirts. During this operation, the lower edges of the skirts of the caps rest upon the lip 147 of the plate 145 and the caps are slightly inclined rearwardly so as to rest against the face of the plate 145. In this way a minimum of friction is presented to the rolling movement of the caps and the caps are advanced at a uniform speed by the pins 168 as above mentioned.

*Heating means*

For heating the band of adhesive 25 on the lower edges of the outer surfaces of the skirts 23 of the caps 20 as they roll along the feed plate 145, there is provided a radiant heating means comprising a row of incandescent lamps 171 of the type emitting heat rays from a concentrated source or filament. The lamps 171 are shown as mounted in sockets 170 carried on a base 172 which is mounted between front and back walls 173 of a lamp housing 177. The walls 173 are formed with bottom flanges 174, which are adapted to rest on and be clamped to the flanges 175 and 176 of the plates 146 and 151 by suitable means shown as clips 186. The lamp housing may thus be removed or assembled by sliding the same longitudinally over the flanges 175.

The lamp housing 177 may be closed by a hood 184 which may be formed integral with the side walls 173. The side walls 173 and hood 184 are shown as provided with louvers 180 to permit the heated air to escape and the base 172 is provided with apertures 181 to permit free flow of heated air upwardly for the above purpose.

The light housing 177 carries a reflector 190, which is attached to the side walls 173 by suitable means such as asbestos blocks 191 which heat insulate the same from the side walls 173 and may be made substantially elliptical in section and arranged so that the filaments of the lamps 171 are located at one focus of the ellipse and bands of adhesive 25 at the top edges of the skirts of the caps 20 are located at the other focus. In this way all light rays emanating from the lamp 171 are focused directly upon the adhesive 25 on the cap skirt as the latter rolls along the feed plate 145. The speed of travel of the caps is such that the adhesive is heat softened and rendered tacky by the radiant heat from the lamps 171 as they roll along the feed plate 145 without materially heating the paper or body of the skirt or of the cap itself.

The lamps 171 are preferably connected to be energized only when the motor 164 is operating. Hence, should the motor stop for any reason the lamps are likewise deenergized, thereby cutting off the source of radiant heat and preventing the caps from becoming damaged or ignited due to excessive exposure to such heat rays. The heat rays may thus be made sufficiently intense to heat soften the thermoplastic adhesive on the skirt of the moving cap without danger of injuring the cap if the feed is interrupted. Furthermore, the operation of the heating means is instantaneous, the heat being available immediately when the machine is turned on and being cut off immediately when the machine is stopped. No warming up period is required, nor is any additional protective means necessary to prevent the caps from becoming overheated.

The normal time required for feeding a cap along the plate 145 is determined in accordance with the heat requirements so that the caps are discharged with the adhesive in softened tacky condition suitable for sealing on a bottle in the manner to be described. As the caps roll along the plate 145 on the lower edge of the skirt all parts of the skirt bearing the adhesive 25 are successively brought into position to receive heat rays from the lamps 171. The rays enter the spaces between the skirt folds and soften the adhesive at the points where maximum adhesion is required.

The pins 168 terminate below the point of focus of the heat rays from the lamps 171. Hence they are not subjected to intense heat and are not required to withstand high temperatures. This also applies to the other mechanical parts which are located beyond the focus of the heat rays.

While a particular type of feed means has been shown, it is to be understood that various other means may be utilized for feeding the cap along the path of the heat rays. It is also to be understood that the radiant heating means herein disclosed may be suitable for other uses and is not restricted to the particular machine disclosed herein.

*Cap applying means*

The caps are discharged from the plate 145 into a vertical delivery chute 195, Figs. 10 and 11, wherein they drop onto a plate 196. The chute 195 may be secured between the brackets 141 and against a cross bar 194 by a pivoted latch bar 193, and may be provided with a positioning lip 192 which rests on one of the brackets 141. The chute 195 may thus be removed by lifting the latch bar 193 and sliding the chute from the frame formed by the ends of the brackets 141 and the cross bar 194.

The plate 196 is mounted for rotation by means of a pin 197 mounted in a bracket 198 secured to the chute 195. A spring pressed ball 200, mounted in the bracket 198 bears against the upper surface of the rotating plate 196 and is adapted to engage recesses 201, Fig. 12, to frictionally position the plate 196 for the purpose to be described.

The plate 196 is provided with a plurality of arms 202 which are adapted to pass beneath the end of the chute 195 and to form stops on which the caps 20 rest in vertical position, as shown in Figs. 10 and 11. The arms 202 are separated by recesses 203 which are of a shape suited to receive the neck of an advancing milk bottle 204 so that the plate 196 is rotated by said bottle as it passes the cap applying station. In the embodiment shown in Fig. 12, each bottle rotates the plate 196 one-third of a complete revolution and positions the succeeding recess 203 to be engaged by the neck of the next succeeding bottle.

The delivery end of the chute 195 is provided with a control plate 210, Figs. 11, 13 and 20, which is slidably mounted on rods 211 held in a bracket 212 attached to the lower end of the chute 195 and pressed inwardly by springs 213. The plate 210 is preferably inclined slightly as shown, and is provided with an inner upturned lip 214 around which the cap slides as it is tipped from vertical to horizontal position by the advancing bottle. The plate 210 is positioned so that in normal operation there is a clearance between the plate and the bottle cap so that the cap does not engage the plate. However, if the cap is incorrectly positioned with respect to the advancing bottle neck a greater amount of clearance may be required to permit the cap to turn as indicated in Fig. 11 in response to movement of the bottle neck. Should this occur, any pressure exerted by the cap against the upturned flange 214 permits the plate 210 to slide horizontally so as to release the cap and permit the same to move freely onto the bottle neck. Furthermore, should the cap tend to tip up or slide from the bottle neck or otherwise be incorrectly positioned the flat plate 210 serves to limit such movement and to cause the cap to be seated on the bottle neck and to remain thereon as the bottle passes to the capping station. The cap thus seated is indicated at Fig. 13.

The bottle neck with the cap 20 loosely seated thereon now passes to the capping station which, as shown in Figs. 1 and 21, comprises a plurality of rotating platforms 220 which receive the bottle and a plurality of rotating capping heads 221, Figs. 1 and 14, which are adapted to fold and compress the skirts of the caps and to seal the same.

The heads 221 may be of any standard type which are adapted to fold the skirts around the bottle necks and to hold the same under pressure until the adhesive sets. One type of capping head suitable for this purpose has been disclosed in the copending application of Carl W. Goodwin, Ser. No. 383,752.

In a standard filling and capping machine of the type above indicated the platforms 220 elevate the bottles into the capping heads 221 which advance with the platforms and hold the folded skirts under pressure a sufficient length of time to permit the adhesive to set. The bottles are then lowered from the heads 221 as indicated in Fig. 15, leaving the caps completely sealed on the bottle neck. The bottle with the caps thus positioned are then discharged onto the conveyor 1 of Figs. 1 and 21 and are ready for delivery or shipment.

In order to actuate the solenoids 123 of Fig. 18, which releases the one-revolution clutch for actuating the picker mechanism, or the solenoid 132 of Fig. 22, a bottle actuated control mechanism may be provided, as indicated in Fig. 21. In this embodiment a contact arm 225 is positioned to be actuated by a bottle as it advances beneath the filling mechanism and before it reaches the capping station C. The position of the contact arm 225 is so selected that the timing of the travel of the bottle between the contact arm 225 and the capping station C correspond to the time required for a cap to be withdrawn from the supply chamber 30 by the picker fingers 54 and to travel through the feed chute to the capping station, so that the cap is in a position to be applied to the bottle as it reaches said station. The arm 225 actuates a switch 226 which closes a circuit to the solenoid 123 above mentioned to synchronize the supply of caps with the supply of bottles so that each bottle is assured of receiving a cap when it reaches the capping station. Furthermore, if there is no bottle in any particular position on the filling apparatus, the arm 225 is not actuated and no cap is removed from the stack. The caps are thus removed only as required and are immediately applied to the bottle neck and pass under the sealing head while the thermoplastic is soft and tacky for sealing.

*Operation*

The operation of the various individual elements of the above mentioned mechanism has been described above. It is to be noted that the complete machine operates as a unit to automatically apply and seal caps of the type above indicated to milk bottles as they are received from the filling machine.

More specifically, the various tubes 16 are first filled with stacks of caps 20 as indicated in Fig. 2. The machine is then ready for operation. As the milk bottles are received from the conveyor 1, Fig. 1, and pass around the filling mechanism F, they successively engage the contact arm 225 and then continue their way to the capping station F beneath the end of the delivery chute 195. The contact arm 225 actuates the solenoid 123 and thereby releases the one revolution clutch, as shown in Fig. 4 to permit the picker mechanism to pass through one cycle of operation each time a bottle reaches the contact arm. The picker fingers 154 advance as indicated in Fig. 5, remove the foremost cap 20 from the stack and release the cap to fall through the discharge chute 97 to the guide plate 147 and thence onto the feed plate 145 along which they are rolled by the advancing pin 168 until they reach the vertical chute 195 down which they fall onto the plate 196. In rolling along the feed plate 145, the band of adhesive 25 on the edge of the skirt passes beneath the row of lamps 171 and is heated by the radiant heat from such lamps as focused by the reflectors 190, so that the caps are discharged to the capping station F with the adhesive in condition for securing the pleated skirt.

The advancing bottles pick up the caps from the capping station F and pass with the caps seated thereon beneath the capping heads 121. The capping heads then fold and seal the skirts as above indicated and release the bottles with the caps permanently secured thereon.

It is to be noted that in the above described apparatus a substantial supply of caps is maintained in the magazine M. In the embodiment shown the magazine contains eight stacks of caps. It is to be understood, however, that this number of stacks may be varied as desired. The arrangement is such that the magazine is automatically advanced to position a new stack in alignment with the supply chamber 30 whenever one stack of caps is exhausted.

The various stacks are accordingly successively made available for the capping mechanism without manual attention and it is only necessary to refill the magazine at infrequent intervals. This feature eliminates the necessity for constant attention which would otherwise be required in maintaining a sufficient supply of caps available. For example, each stack of caps in a tube 16 may contain 250 caps. The entire eight stacks accordingly contain 2000 caps which, with the machine operating to cap 100 bottles per minute, is sufficient to operate the machine for twenty minutes.

The entire cap applying mechanism, including the magazine M, the picker mechanism P and the feed chute C is mounted on the pedestal 7. Consequently, the mechanism may be positioned to supply caps to bottles between the filling station F and the capping heads H of a standard filling and capping machine, such as that commonly used for applying disc caps to milk bottles. In that event the disc capping heads are removed and capping heads 221 of the type above indicated are substituted therefor. Otherwise, no changes are required in the machine.

It is to be understood that the time of heating of the caps in the feed chute and the sealing time of the capping head 221 may be selected in accordance with the particular adhesive being used so that the adhesive is first heated to the proper temperature for softening the same and the caps are later held under pressure in the sealing head a sufficient time to allow the adhesive to set and permanently secure the folds of the skirt.

It is to be noted that heat applied is in the nature of flash heat or radiant heat and that the adhesive is heated rapidly and efficiently without heating the corresponding portion of the cap or skirt. In this way the time required for heating the adhesive is greatly reduced and at the same time the sealing time is correspondingly reduced. Inasmuch as the cap skirt is comparatively cool and the body of the cap is substantially unheated, the adhesive is cooled to a setting temperature substantially immediately by the cold milk bottle when the skirt is folded therearound in the capping head. At the speed of operation above mentioned by way of example, substantially flash heating and flash cooling is obtained. In this way, the adhesive-coated, skirted caps are applied to milk bottles and sealed thereon during the time usually required for applying discs to milk bottles in standard filling and capping machines. The cost of operation and the attention required in the dairy is accordingly not greatly increased, an important feature in the dairy industry where the margin of profit is decidedly small and the cost of capping must be kept to a minimum.

Although a specific embodiment of the invention has been shown for purposes of illustration, it is to be understood that various changes and modifications may be made therein as will be readily apparent to a person skilled in the art. Furthermore, the various features set forth above may be applied individually to other types of capping machines and for other uses and are not restricted to the specific combination disclosed. The invention is only to be limited in accordance with the scope of the following claims.

What is claimed is:

1. A machine for applying to containers and sealing thereon partially preformed hood caps having foldable pleated skirts carrying a thermoplastic adhesive coating for securing the folds around the container neck, which comprises a supply chamber containing a stack of said caps, a magazine containing a plurality of reserve stacks of caps, means actuated by the caps in said chamber for feeding successive reserve stacks thereto so as to maintain a continuous supply of caps in said chamber, a feed chute having a surface along which said caps are adapted to roll, picker mechanism for removing the caps successively from said supply chamber and feeding the caps to said feed chute, means rolling said caps on the edges of their skirts along said surface, means to heat soften the adhesive coating on the cap skirts as the caps roll along said chute to thereby render the coating tacky for sealing, means applying said cap from said feed chute with its adhesive tacky for sealing onto a bottle to be capped, and sealing mechanism adapted to fold said pleated skirt around the bottle neck and to apply sealing pressure thereto until said adhesive has set for permanently securing said folds together.

2. A machine for applying to containers and sealing thereon partially preformed hood caps having foldable pleated skirts carrying a thermoplastic adhesive coating for securing the folds around the container neck, which comprises a supply chamber containing a stack of said caps, a feed chute having a surface along which said caps are adapted to roll, picker mechanism for removing the caps successively from said supply chamber and feeding the caps to said feed chute, means rolling said caps in substantially vertical edgewise position on the lower edges of their skirts along said surface, means heat softening the adhesive coating on the cap skirts as the caps roll along said chute to thereby render the coating tacky for sealing, means applying said cap from said chute with its adhesive tacky for sealing onto a bottle to be capped, and sealing mechanism adapted to fold said pleated skirt around the bottle neck and to apply sealing pressure thereto until said adhesive has set for permanently securing said folds together.

3. A machine for applying to containers and sealing thereon partially preformed hood caps having foldable pleated skirts carrying a thermoplastic adhesive coating for securing the folds around the container neck, which comprises a supply chamber containing a stack of said caps, a feed chute having a surface along which said caps are adapted to roll, picker mechanism for removing the caps successively from said chamber and feeding the caps to said feed chute, means rolling said caps in substantially vertical edgewise position on the edges of their skirts along said surface, means to heat soften the adhesive coating on the cap skirt as the caps roll along said chute, to thereby render the thermoplastic adhesive tacky for sealing, mechanism positioning the caps from said chute in vertical position in a capping station to be engaged by the advancing containers and seated thereon by the horizontal movement of the containers past said capping station, and sealing mechanism to fold and press the pleated skirts around the container necks and to hold the skirts under sealing pressure until said adhesive has cooled to setting temperature.

4. A machine for applying to containers and sealing thereon partially preformed hood caps having foldable pleated skirts carrying a thermoplastic adhesive coating for securing the folds around the container neck, which comprises a supply chamber containing a stack of said caps nested with their skirts extending rearwardly, a magazine containing a plurality of reserve stacks of caps, means actuated by the stack of caps in said chamber for successively supplying said reserve stacks to said supply chamber so as to maintain a continuous supply of caps therein, a feed chute having a surface along which said caps are adapted to roll, picker mechanism for removing the caps successively from said chamber and feeding the caps to said feed chute, means rolling said caps in substantially vertical edgewise position on the edges of their skirts along said surface, means to heat soften the adhesive coating on the cap skirt as the caps roll along said chute, to thereby render the thermoplastic adhesive tacky for sealing, mechanism positioning the caps from said chute in vertical position in a capping station to be engaged by the advancing containers and seated thereon by the horizontal movement of the containers past said capping station, and sealing mechanism to fold and press the pleated skirts around the container necks and to hold the skirts under sealing pressure until said adhesive has cooled to setting temperature.

5. In a machine for applying to containers and sealing thereon partially preformed hood caps having foldable pleated skirts, a supply chamber containing a stack of said caps for successive removal and application to bottle necks, a supply magazine containing a plurality of reserve stacks of caps, said magazine comprising a rotatable turret, a plurality of stack receiving tubes spaced peripherally around said turret and carried thereby, said tubes being adapted to successively register with the supply chamber as said turret is rotated, driving means to rotate said turret, and cap actuated means actuated by the caps in said chamber for controlling said driving means, said cap actuating means energizing said driving means to advance said turret when the supply of caps in said supply chamber has become exhausted and de-energizing said driving means to stop said turret when caps are again supplied to said chamber from a tube which has been brought into registration therewith, said driving means being connected to continue in operation after energization until de-energized by said cap actuated means.

6. In a machine for applying to containers and sealing thereon partially preformed hood caps having foldable pleated skirts, a supply chamber containing a stack of said caps for successive removal and application to bottle necks, a supply magazine containing a plurality of reserve stacks of caps, said magazine comprising a rotatable turret, a plurality of stack receiving tubes spaced peripherally around said turret and carried thereby, said tubes being adapted to successively register with the supply chamber as said turret is rotated, driving means to rotate said turret and cap actuated means controlling said driving means to advance said turret automatically when one supply of caps in said supply chamber has become exhausted, whereby a continuous supply of caps is maintained in said supply chamber from said magazine, said driving means comprising an electric motor and a non-reversible mechanical gear train connecting said motor to said turret whereby said turret remains in successive positions when the operation of said motor is interrupted.

7. In a machine for applying to containers and sealing thereon partially preformed hood caps having foldable pleated skirts, a supply chamber containing a stack of said caps for successive removal and application to bottle necks, a supply magazine containing a plurality of reserve stacks of caps, said magazine comprising a rotatable turret, a plurality of stack receiving tubes spaced peripherally around said turret and carried thereby, said tubes being adapted to successively register with the supply chamber as said turret is rotated, driving means to rotate said turret, cap actuated means actuated by the caps in said chamber for controlling said driving means, said cap actuating means energizing said driving means to advance said turret when the supply of caps in said supply chamber has become exhausted and de-energizing said driving means to stop said turret when caps are again supplied to said chamber from a tube which has been brought into registration therewith, said driving means being connected to continue in operation after energization until de-energized by said cap actuated means, and means securing said turret against rotation except when said driving means is operating.

CARL W. GOODWIN.
HAROLD W. MARTIN.